F. WEIR.
SWEET POTATO SETTER.
APPLICATION FILED JUNE 12, 1912.
1,058,396.
Patented Apr. 8, 1913.
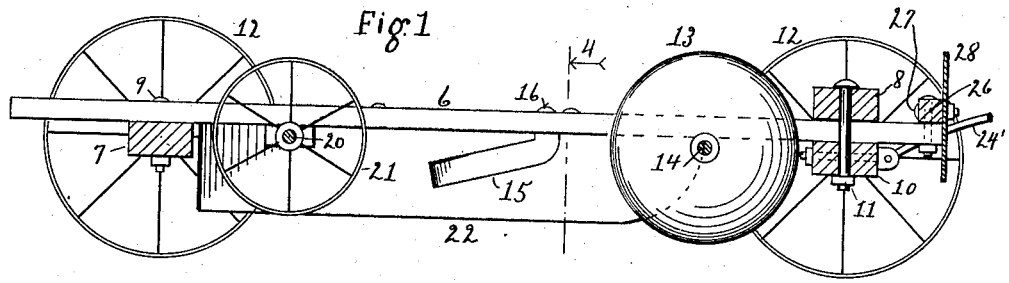
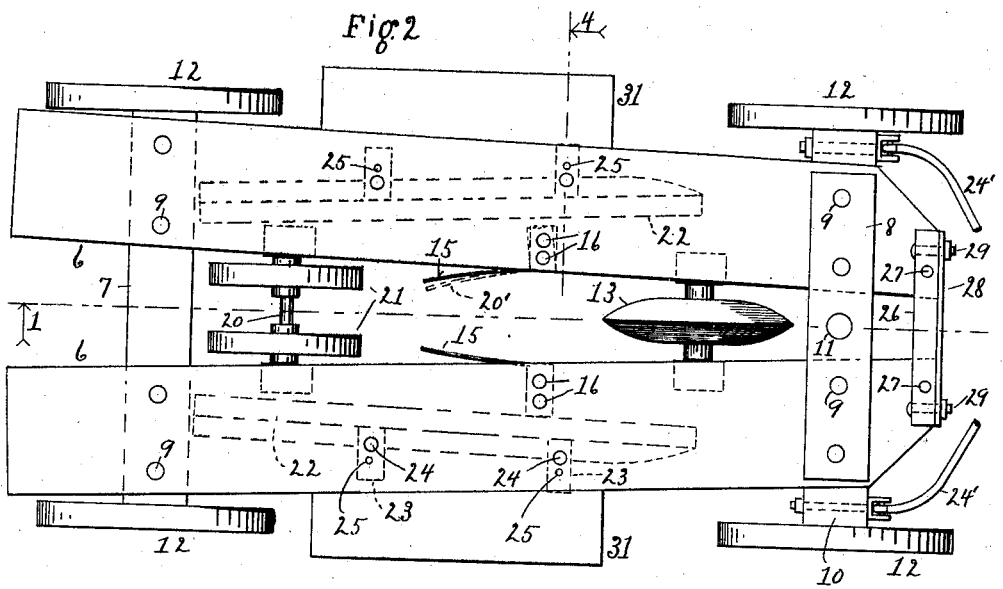
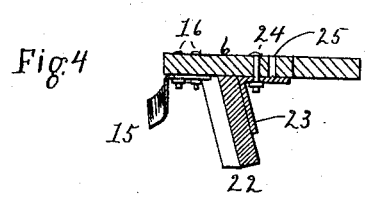
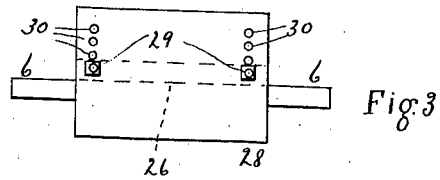
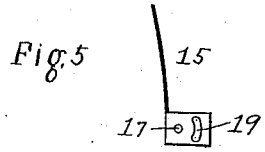
Witnesses
J. M. Stark
C. E. Curry
Inventor
Frank Weir
By J. A. Hmm Atty
COLUMBIA PLANOGRAPH CO., WASHINGTON, D. C.

UNITED STATES PATENT OFFICE.

FRANK WEIR, OF SILVER LAKE, KANSAS.

SWEET-POTATO SETTER.

1,058,396.   Specification of Letters Patent.   Patented Apr. 8, 1913.

Application filed June 12, 1912.   Serial No. 703,182.

*To all whom it may concern:*

Be it known that I, FRANK WEIR, a citizen of the United States, residing at Silver Lake, in the county of Shawnee and State of Kansas, have invented certain new and useful Improvements in Sweet-Potato Setters, of which the following is a specification.

My invention is a machine adapted especially for setting out sweet potato plants. The machine is mounted on wheels; has a drop-board at the front to smooth the top of the ridge, the drop board being adjustable in order to gage the depth of the furrow in which the plants are to be set; has a furrow-cutting wheel arranged behind the drop-board, a pair of angle-knives behind the cutter to throw the dirt back into the furrow and around the plants, and a pair of press wheels behind the knives to pack the dirt on both sides of the plants; also it has two flare-boards so arranged as to run along the sides of the ridge to keep the machine at all times in proper position with the cutter in the exact center of the ridge. The operator rides on the machine which also carries the plants and sets the plants in the furrow between the knives. In this latter respect, my machine differs from other planting or setting machines, for I do not place the individual plants in the machine and then depend upon the machine automatically setting the plants in the ground. And my invention comprises the parts, improvements, and combinations, and the special arrangement, as hereinafter set forth and claimed.

In the drawings accompanying and forming part of this specification and in the description of the drawings I have shown my invention in its preferred form, and what I deem to be the best mode of applying the principles thereof; but it is to be understood that, within the scope of the appended claims, I contemplate changes in form, proportions, and materials, the transposition of parts, and the substitution of equivalent members, without departing from the spirit of my invention.

Figure 1 is a vertical longitudinal sectional elevation of a machine made in accordance with the principles of my invention, on a plane indicated approximately by the line 1 in Fig. 2. Fig. 2 is a plan view, certain concealed parts being shown in dotted outline. Fig. 3 is a view of the front end showing the drop-board. Fig. 4 is a transverse sectional elevation of certain parts through the line 4 in Figs. 1 and 2. Fig. 5 is a top view of one of the knives.

Similar reference characters indicate like or corresponding parts throughout the several views.

The main part of the frame comprises two planks 6, 6, secured to the rear axle 7 and to a cross-piece 8 above the front axle 10, by means of bolts 9, 9; the front axle being pivoted thereto by means of the kingbolt 11.

12, 12 are the wheels mounted on the axles.

The planks are arranged with an opening between them, the opening being preferably narrower at the front end than at the rear.

13 is a cutter wheel mounted between the planks at the front, just back of the front axle. This cutter is mounted so as to face directly to the front, its rim being sharp and its sides being curved so as to make both sides convex, being thus capable of cutting a furrow of sufficient width for the insertion of the plants. The purpose of facing the cutter directly to the front is to make it ride exactly in line at all times without any tendency to swerve to either side.

Just behind the cutter are the two angle-knives 15, 15, secured to the under side of the planks by the two bolts 16 for each knife. Each knife has a hole 17 and a slot 19 for the respective bolts, whereby each knife may be adjusted to throw the dirt at any angle desired within a reasonable range, an adjustment being indicated by the dotted outline 20' in Fig. 2.

20 is a shaft mounted in the opening just behind the knives, and on the shaft are mounted the two press wheels 21, which are adapted to pack the dirt on both sides of the furrow which has been cut by the cutter and filled by the knives.

22, 22 are two flare boards secured to the under side of the frame by means of two braces 23, 23 for each, each brace being secured to the plank by a bolt 24, and there being extra holes 25 to permit adjustment inwardly or outwardly. The flare-boards slant outwardly from the top down, and are a little closer together at the rear than at the front. Their purpose is to ride along the sides of the ridge, to prevent the machine from swerving to either side, and to keep the machine with the cutter in the exact center at all times.

26 is a transverse cleat secured to the front end of the frame by means of bolts 27, 27.

28 is the drop-board secured to the front end of the frame by means of the bolts 29, 29, which pass through the cleat. The drop-board is adjustable vertically by shifting it so that the bolts pass through any pair of the bolt holes 30, which are arranged quite close together to permit any desired adjustment. The purpose of the drop-board is to smooth the top of the ridge in advance of the other parts of the machine, and to smooth it down to such a level as will make the furrow of proper depth for planting.

24' is the bow of the tongue; and 31, 31 are merely side extensions to give more room.

The plants which are to be set out are carried on the frame; and the operator sits on the frame in any position convenient for handling the plants and placing them in the furrow between the knives as the machine is drawn along. As noted, there is considerable room on the planks, so that a large supply of plants may be carried, as in a box on the rear.

It will be noted that I have avoided complications in my machine, that on account of its extreme simplicity it is very cheaply made and not easily gotten out of order, and that it is no more difficult for the operator than in the more complicated machines, and yet is so arranged that the operator can easily set each plant in the ground in proper position.

What I claim is:

1. The combination of four wheels, front and rear axles on which the wheels are mounted, a cross-piece above the front axle and pivoted thereto, two horizontally disposed planks secured to the cross-piece and the rear axle with an opening therebetween that is narrower at the front than at the rear, a cleat secured to the front end of the planks, a drop-board having two series of holes, bolts passing through the cleat and holes; a cutter wheel having convex sides mounted in said opening behind the drop-board, said cutter facing directly forward; a pair of knives, each having a hole and a slot, and secured to the respective planks on opposite sides of the center line of and behind the cutter, and bolts for securing said knives to the planks through the holes and slots respectively; a pair of press wheels mounted in said opening behind the knives and on opposite sides of the center line of the cutter; and a pair of flare-boards secured to the under side of the respective planks and adapted to run along the sides of the ridge, said flare-boards being closer together at the rear than at the front and slanting outwardly from the top down.

2. In combination, a frame, wheels on which said frame is mounted, an adjustable drop-board on the front of the frame, a cutter wheel having convex sides and facing directly forward and arranged behind the drop-board, a pair of knives adjustably secured to the frame behind the cutter and on opposite sides of the center line of the cutter, a pair of press wheels behind the knives and on opposite sides of the center line of the cutter, and a pair of flare-boards depending from the frame and adapted to run along the sides of the ridge.

3. In combination, four wheels, front and rear axles on which the wheels are mounted, a cross-piece above the front axle and pivoted thereto, two horizontally disposed planks secured to the cross-piece and to the rear axle with an opening therebetween, a drop-board secured to the front end of the machine for leveling the top of the ridge, a cutter wheel having convex sides and mounted in said opening behind the drop-board and facing directly forward, a pair of knives behind and on opposite sides of the center line of the cutter, a pair of press wheels behind the knives and on opposite sides of said center line, and a pair of flare-boards depending from the planks and adapted to run along the respective sides of the ridge.

4. In combination, a frame mounted on wheels and having an opening along its center portion above the knives, a drop-board secured to the front of the frame for leveling the top of the ridge, a cutter for making a furrow, said cutter being behind the drop-board, a pair of knives behind the cutter and adapted to throw the dirt back into the furrow, and a pair of press wheels behind the knives to pack the dirt on both sides of the plants set in the furrow.

5. In combination, a frame mounted on wheels and having an opening above the knives, a cutter mounted in the front part of the machine for making a furrow, a pair of knives behind the cutter for throwing the dirt back into the furrow, and a pair of press wheels behind the knives to pack the dirt on both sides of the plants set in the furrow between the knives.

6. In combination with a frame mounted on wheels, ridge-top leveling, furrow-opening and closing devices, and press wheels arranged along the center line of the machine, and a pair of flare-boards depending from the frame and adapted to run along the sides of the ridge.

In testimony whereof I have affixed my signature in presence of two witnesses.

FRANK WEIR.

Witnesses:
C. E. CURRY,
J. M. STARK.